Figure 1:
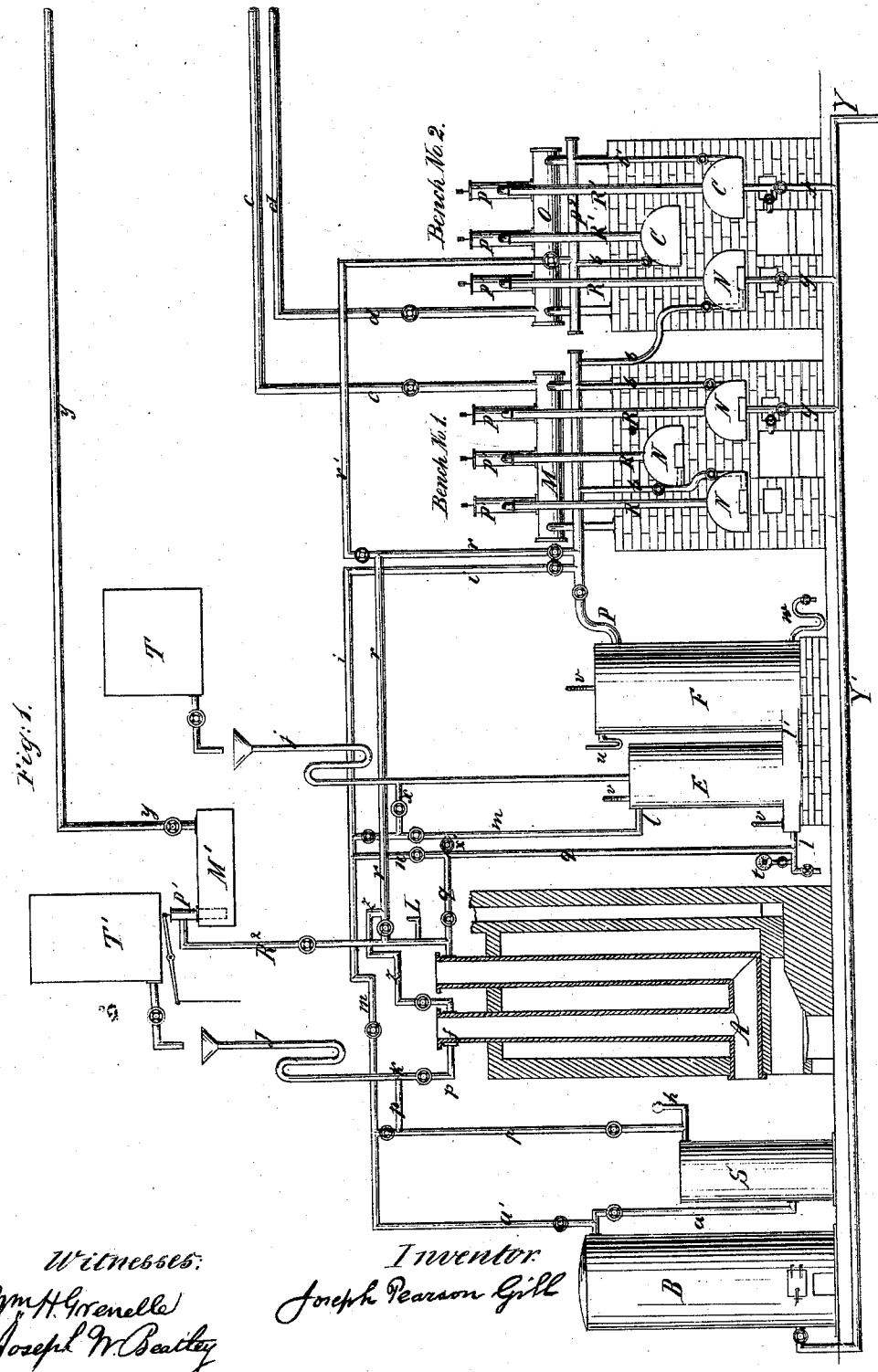

4 Sheets—Sheet 1.

J. P. GILL.
MANUFACTURE OF GAS.

No. 171,117. Patented Dec. 14, 1875.

Witnesses:
Wm. H. Grenelle
Joseph W. Beatley

Inventor:
Joseph Pearson Gill

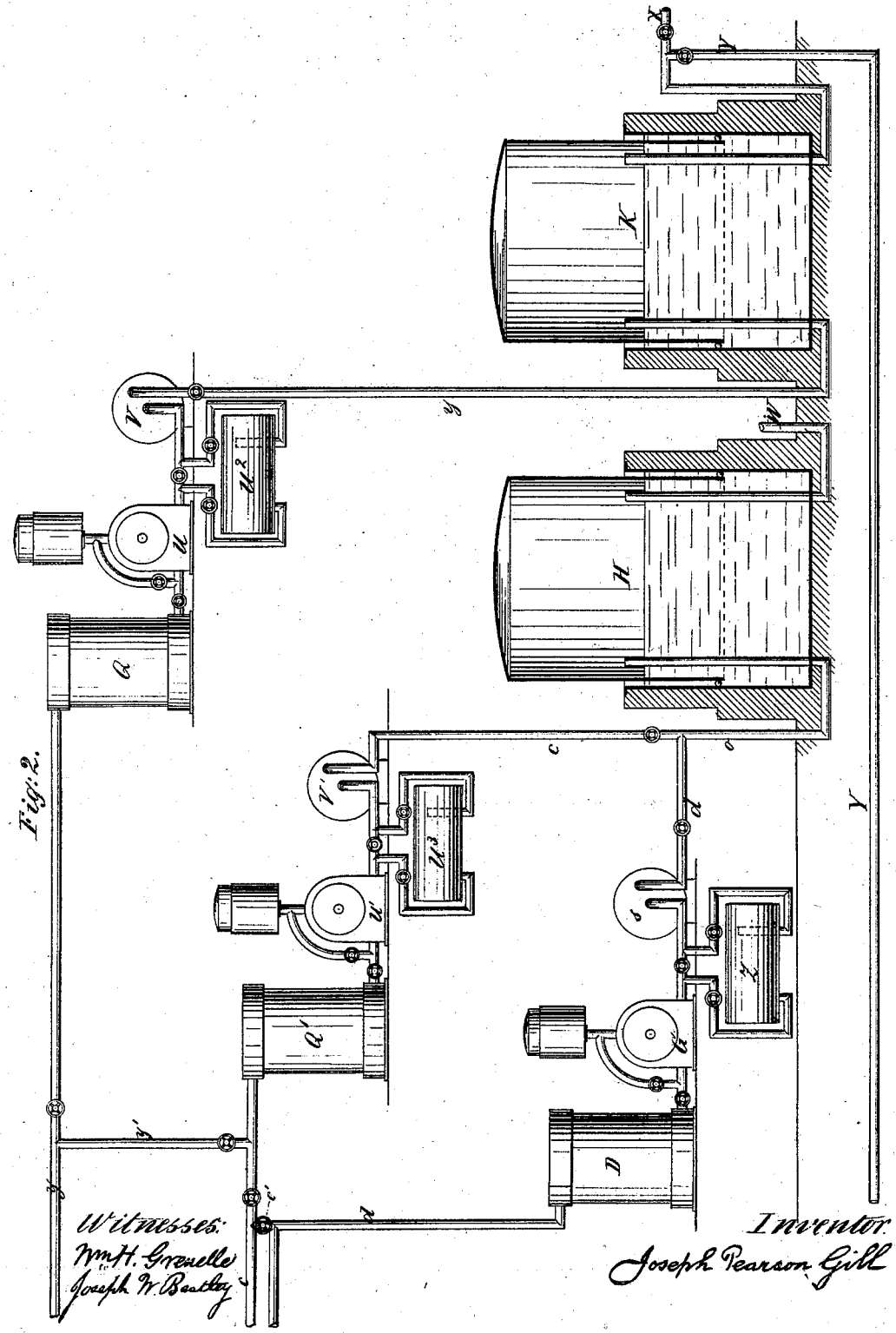

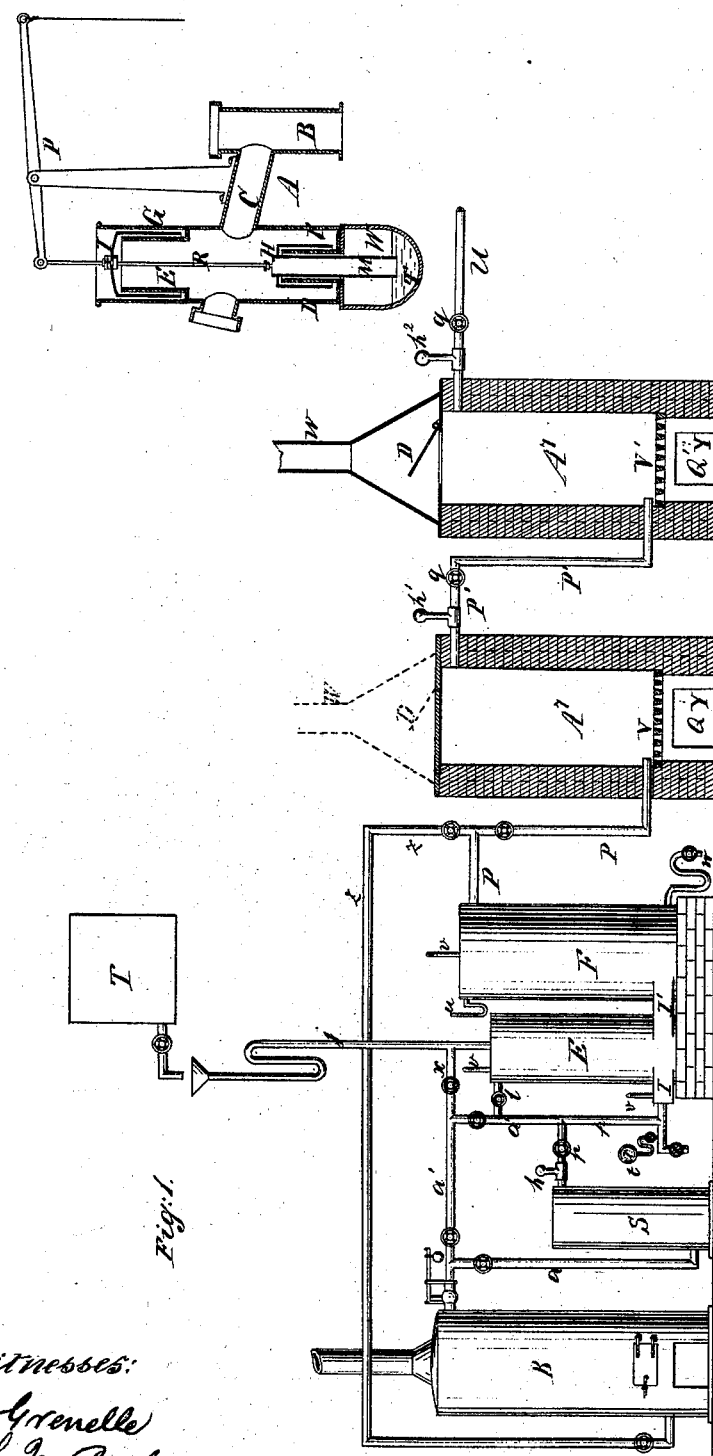

J. P. GILL.
MANUFACTURE OF GAS.
No. 171,117.   Patented Dec. 14, 1875.
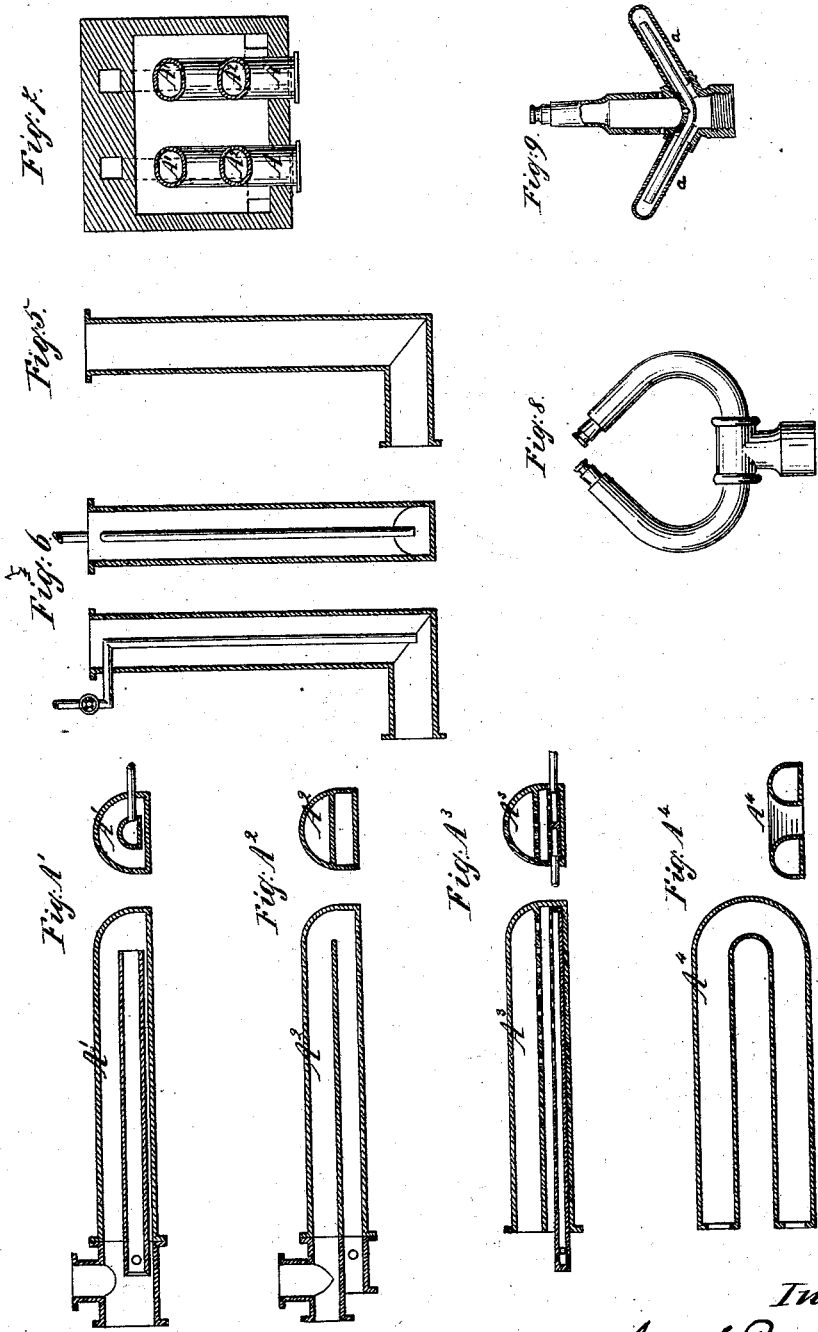

UNITED STATES PATENT OFFICE.

JOSEPH P. GILL, OF NEWARK, N. J., ASSIGNOR TO ROBERT W. RUTHERFORD AND JOSEPH P. GILL, TRUSTEES OF THE ILLUMINATING GAS APPARATUS CONSTRUCTION COMPANY.

IMPROVEMENT IN THE MANUFACTURE OF GAS.

Specification forming part of Letters Patent No. 171,117, dated December 14, 1875; application filed November 29, 1874.

*To all whom it may concern:*

Be it known that I, JOSEPH PEARSON GILL, of the city of Newark, in the county of Essex and State of New Jersey, have invented certain new and useful Improvements in the Manufacture of Gas for illuminating and heating purposes; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The nature of my invention consists in improvements in the method of manufacturing hydrogen gas; in the combination of hydrogen gas, superheated steam, and petroleum and its distillates, and other solid and liquid hydrocarbons, and in the means employed in manufacturing, in operating, and in using the same, of which the following is a description, illustrated by the accompanying drawings, that are hereby made part of this specification.

In the manufacture of hydrogen gas I use several kinds of retorts, either of which may be employed as circumstances may require, that the process may be applied to gas-works already in operation as well as to new works. Said retorts may be either horizontal or vertical. The vertical retorts may be either single or, preferably, double, as at A, Plate 1. This retort is filled with pieces of iron of a suitable size, such as iron chains or scraps or similar pieces, which are heated to a cherry-red heat.

Steam is made in a boiler, B, and superheated in a superheater, S, which may be of any of the forms used. Thence it passes by the pipe $p$ to the top of one of the divisions of the vertical retort A, when such is used, entering it at the point $f$. The superheated steam passes down through the hot iron in the first apartment and up through it in the second, and is decomposed into hydrogen gas, the oxygen of the steam combining with the iron, setting the hydrogen free. In a short time, as is well known, the iron becomes oxidized or coated with rust and ceases to act, and the steam passes through the retort in an unconverted state as superheated steam. My improvement at this stage of the process consists in restoring the action of the iron by the use of naphtha or other hydrocarbon liquids or vapors. When naphtha or oil is employed it is made to flow in a small stream—for instance, from a tank, T', through a siphon-pipe, J, into the pipe $p$ at the point K. The naphtha and superheated steam pass together into the retort A, and the iron, by the action of the hydrocarbon, becomes deoxidized, and its property of decomposing steam is restored. The decomposition of the steam is continued, and the process is thus maintained uninterruptedly.

At a suitable period, which can be readily ascertained by means of a test-burner, L, the naphtha may be shut off, and the manufacture of hydrogen gas goes on as at first, until the iron becomes reoxidized, when the naphtha is let into the retorts as before. Thus an uninterrupted and continuous process of making hydrogen is maintained.

The hydrogen, united with any carbonic-oxide gas which may have resulted from the use of the hydrocarbon in the retort, or with any superheated steam that may have gone through the retort without undergoing decomposition, then passes through the pipe $q$ to a double closed vessel or still used by me for the purpose of vaporizing, combining, and expanding naphtha or other hydrocarbon liquids. This vessel consists of two parts—a chamber, E, in which to vaporize the hydrocarbon, and a chamber, F, in which to effect a perfect combination or commingling of the vapor and hydrogen, and to permit its expansion to the degree required to enable it to be rapidly and effectively converted into gas in the gas-retorts. The chambers are united at the bottom by means of the passage-way I'. The hydrogen enters the still at the point I, while the naphtha or other hydrocarbon liquid is allowed to flow from a tank, T, through the siphon-pipe $j$ into the top of the vaporizing-chamber E, where it is vaporized by means of the heated hydrogen gas. At the same time superheated steam may be admitted, if required, through the pipes $m$ and $p$, and hydrogen by means of the connecting-pipe $x'$, to assist in vaporizing the hydrocarbon or to regulate the quantity and quality of the gas made. The hydrogen and vapors pass through the passage-way $I'$ into the chamber F, where they intimately combine and are allowed to expand as required, from whence they pass through the pipes P $b$ to the gas-retorts N, entering them through the side of their mouth-pieces. The vapors pass through a brick or other flue, or a pipe to the rear of the retorts, returning to the front again, and are converted in their passage therein to a fixed gas. These retorts may be any ordinary coal-gas retorts. The still has steam-gages, as at $t$, for ascertaining the pressure of the steam; pressure-gages, as at $u$, for ascertaining the pressure in the still, and thermometers, $v$, for observing the temperature, and a siphon, $w$, for letting off any condensation. If properly conducted there will be no condensation of or loss of the hydrocarbon in the still. There is no liquid of any kind filled into the still, nor is any to be permitted to accumulate in it during the process of manufacture. The gas thus made, on passing from the retorts N in bench No. 1, is subjected to the usual treatment in the hydraulic main M, condensers $Q'$, exhauster $U^1$, purifiers $U^3$, and station-meter $V'$, and passes directly through the pipe $c$ to the holder H, it being strictly a commercial gas, of the proper illuminating power and specific gravity, and burning without smoke, or it may pass from the retorts N of No. 2 bench into the hydraulic main O of the coal-gas retorts C, combining with the crude coal-gas therein, and being subject to the same subsequent treatment in the condensers D, exhauster G, purifiers Z, and station-meters $s$, from which it passes through the pipe $o$ to the holder H. Instead of hydrogen gas from the retorts A, superheated steam may pass directly from the superheater S through the pipes $p$ $m$ $n$ $q$ into the double still at I, and the commingled superheated steam and hydrocarbon vapors may pass from the chamber F through the pipe P and branch pipes $b$ to the retorts N, and be converted into fixed gas.

The superheated steam and hydrogen gas may also pass, with the hydrocarbon liquid, into the top of the chamber E, through the pipes $p$ $m$ $q$, by means of the branch pipes $x$ $x'$, which connect $m$ with the pipes $j$ and $q$. The superheated steam also passes through the pipes $p$ $m$ $i$ into the vapor-escape pipe P, to assist in regulating the manufacture of the gas. The hydrogen may also pass through the pipes $R^2$ $r$ into the pipe P, for the same purpose.

The pipes $i$ $r$ enter the pipe P at right angles, in order that the steam or hydrogen shall not enter the pipe P in an oblique direction, either forward or backward, it thus being prevented from acting as an exhaust from the still in the one direction, and from forcing a back pressure into it in the other.

The commingled hydrogen gas and hydrocarbon vapors escaping from the retorts A may also pass directly to the retorts N, through the pipe $r$, which connects with the pipe P, without passing through the still.

When superheated steam is let into the double still to vaporize the hydrocarbon liquid, the commingled superheated steam and hydrocarbon vapors escaping from the chamber F, instead of passing to the retorts N, may pass, by means of the pipes P $r$ $z$, to the double upright retorts A, and be converted into gas therein, and then pass through the pipe $R^2$ to the hydraulic main $M'$, then by the pipes $y$ and $y'$ to the condensers $Q'$, exhauster $U^1$, purifiers $U^3$, and station-meter $V'$, and thence to the holder H.

The hydrogen gas made in the retorts A may pass through the pipes $R^2$ $r$ $r'$ and P $P^2$ $b$ $b'$ to the retorts N and C, to assist in the manufacture of the naphtha and coal-gases, by combining with the undecomposed vapors and tar, thus enabling them to be converted into illuminating gases, when they would otherwise pass to the tar-well. The hydrogen gas also acts as a diluent of the rich hydrocarbon gases which may be manufactured, enabling them to be burned without smoke, and with sufficient size of flame to throw off the largest quantity of light.

The hydrogen gas made in the retorts A may also pass directly through the pipe $R^2$ to the hydraulic main $M'$, through the pipe $y$ to the condensers Q, exhauster U, purifiers $U^2$, and station-meter V, and thence to the holder K, to be stored for distribution through the pipes X and Y, for heating purposes.

The hydrogen passes through the pipe Y, from the holder K to the retort-benches Nos. 1 and 2, and by means of branch pipes, as at $e$ and $g$, enters the retorts to assist in the manufacture of gas, as before mentioned, and may enter the furnaces, and also be conducted to the boiler B by the pipe $Y'$, to assist, in combination with the coke or coal, in the heating thereof.

Beside the upright retorts A for the manufacture of hydrogen gas, other retorts may be used. One description is the horizontal retort, plate 5, Fig. $A^1$, with a small retort inside of it, open at the back, but not reaching to the back of the larger retort. Both of these retorts are filled with iron chains or small pieces of iron. The superheated steam and hydrocarbon pass through the inner retort, and return to the front of the larger one, and in their passage through the heated iron the superheated steam is decomposed into hydrogen gas.

Another form is the double retort-plate 5, Fig. $A^2$, which has a division-plate or diaphragm connecting the two sides and located half-way between the top and bottom. The diaphragm does not reach to the back of the retort. Both divisions are filled with iron as before, and the superheated steam enters one division, passes to the rear, and returns to the front in the other, or the diaphragm may connect with the back, with small holes in it, the retort having also a false bottom with small holes in it, as in plate 5, Fig. $A^3$.

There may also be a single upright retort, as in Plate 5, Fig. $A^5$, and the superheated steam may enter at the mouth-piece, and the gas be discharged at the top of the retort, or vice versa, or a pipe may descend in the vertical part to near the bottom, as in Fig. $A^6$, and the superheated steam may pass through the pipe and escape from the bottom of it, and the gas be discharged at the top of the retort.

Another form is the U-retort, Plate 5, Fig. $A^4$. This retort may be placed with both arms or branches on a level, or may be so arranged that one branch may be above the other. Both branches of this retort are filled with small pieces of iron or chain, or iron wire, and the superheated steam, in its passage through the red-hot iron or wire, is converted into hydrogen, as before. Commingled superheated steam and hydrocarbon vapors may be conveyed from the vapor-chamber F of the double still, as by the pipes P $rz$, to all of these hydrogen retorts, of whatever description, to be used in connection with the iron therein, for the continuous manufacture of hydrogen gas, instead of superheated steam and hydrocarbon liquids, as before mentioned. I also combine commingled superheated steam and hydrocarbon vapors produced by any other method with iron in retorts, in the manner herein described, for the manufacture of hydrogen gas.

Besides these retorts, described as used above, and heated from without in a furnace or bench, I use an upright vessel or retort, $A^7$, Plate 3, Fig. 1, which may be either of brick or iron, and heated entirely from within. It is lined with fire-brick. It has an ash-pit, Q', with a door, Y, and an iron grate, V, to support the iron chains or pieces of iron with which the interior spaces of the vessel is filled. There is a damper, D, on top opening into the smoke-stack W, and a pipe, P', having a valve, $q$, leading to the usual condensers, exhauster, purifiers, meter, and holder. A pyrometer, $h^1$, indicates the temperature. There is a pipe, P, conveying commingled superheated steam and hydrocarbon vapors from a still, and opening into the vessel among the pieces of iron just above the grate. To put the apparatus in operation the damper D and ash-pit door Y are opened and the valve $q$ closed. The commingled vapors from the still, as they are discharged into the vessel from the pipe P, are fired, and are allowed to burn until the iron with which the vessel is filled is of a bright cherry-red heat. The valve $q$ is then opened, and the door Y and damper D are closed. The air not being permitted to enter the vessel the vapor ceases to burn, and the superheated steam is decomposed into hydrogen gas by the red-hot iron. When the iron becomes too cool to decompose the superheated steam, the door Y and damper D are opened, and the valve $q$ closed, and the vapors escaping from the pipe P are again fired, and allowed to burn until the iron is reheated, when the valve is opened and the door and damper closed, and the process continues as before. The commingled superheated steam and hydrocarbon vapors may be conducted from the still, by means of the pipe $z$ to the boiler B, to be burned in the fire-place thereof for the purpose of heating it, in lieu of other fuels. Two vessels or retorts may be connected together, Plate 3, Fig. 1, by the pipe $P^1$, the second having the damper D, with the pipe U and valve $q$ leading to the condensers, exhauster, purifiers, station-meter, and holder. The operation of the two vessels or retorts together is the same as if one alone were used, the second being but a continuation or prolongation of the first.

These vessels, or either of the hydrogen retorts described, may be substituted for the retorts A in the specification and drawings, whenever convenient or deemed desirable.

In the manufacture of gas, by the use of the exhauster, a freedom from any back pressure from the holder, purifiers, &c., is maintained within the hydraulic main, and when the retorts are in operation I raise the dip-pipe M by means of a lever and two floats and cup attachments to the bridge-pipe A, connecting the stand-pipe and hydraulic main W, Plate 3, Fig. 2, for the purpose of giving a free passage for the gas from the retorts into the hydraulic main.

The vertical pipe of the said bridge-pipe, which connects with the hydraulic main, is made sufficiently large to allow an annulus or circular cup, F, to be cast on the inside of it on the half below the horizontal pipe C, and a corresponding cup, G, on the upper half E. These cups are about one inch wide between the two sides, and of sufficient depth to seal the holders or floats that move in them, the inside diameter of the cups to be large enough to allow the free passage in them of the movable dip-pipe M. The dip-pipe is attached at its top to the float H, that dips in the lower cup F, and is connected by the rod R to the float I, that dips in the upper cup G, the two floats and dip-pipe being suspended and moved by the lever P. The dip-pipe is open at both bottom and top. When the floats are down the dip-pipe will dip into the tar T in the hydraulic main W, and be sealed, so that no gas can pass up it. The floats will also be sealed in their respective cups, so that no gas can return into the stand-pipe B or escape into the air through J; nor can air enter the stand-pipe through I. When the floats are raised by means of the lever P the bottom of the dip-pipe is raised above the tar in the hydraulic main, and the gas, rising through B and C from the retort, passes down the dip-pipe M, and escapes freely at its bottom. The gas cannot escape from the floats, they being sealed in their cups, the cups being cast deep enough to allow sufficient seal to the floats when they are raised up to their highest level. By this arrangement of the two floats and cups a stuffing-box for the rod R is avoided. There are no joints or valves to leak, and no friction to cause wear and tear of the parts, and the action of sealing and unsealing the dip-pipes is simple and easy. The upper float I is securely attached to the rod R, in such manner as to permit its easy removal from the cup G without removing the rod and dip-pipe whenever an examination of the dip-pipe M or the lower cup F may be required. The upper cup G is made large enough in its interior diameter to allow the free passage through it of the lower float H with the movable dip-pipe M attached. By this means the two floats and the movable dip-pipe can be instantaneously lifted out from the bridge-pipe, to allow free access to it and to the hydraulic main whenever they may require cleaning, or an obstructive accumulation of tarry or pitchy substances in the hydraulic main or lower cup may require to be removed. The removal of the floats and dip-pipe, it is obvious, is not delayed for the loosening of any joints or unscrewing of any bolts or nuts. This is of great advantage in the practical operations of gas-works, when such removal and cleansing has to be done without loss of time, and without interrupting the progress of manufacture.

The commingled superheated steam and hydrocarbon vapors may be conveyed from the double still E F through the pipes P r z, or from any other still when used in combination, to the retorts A, or to any of the retorts which may be substituted for them, for the manufacture of hydrogen gas, the said retorts being filled with iron, and the commingled hydrogen, superheated steam, and hydrocarbon vapors may be conducted from such still to said retorts, or a part of them, to be converted into illuminating-gases. This arrangement is especially adapted to small works, where one bench of retorts may be all that may be required.

The hydrogen gas passes from the holder K, through the pipe X, to the street-mains, to be used for heating purposes, being used in any of the ordinary gas stoves or furnaces.

The rich illuminating-gas that may be made by the process described in this specification is properly consumed in a double burner, in which the two flames are made to impinge upon each other, as in Plate 5, Fig. 8, or in a burner in which the gas is heated in its passage to the point of consumption, as in a burner constructed on the following plan, Plate 5, Fig. 9, in which there are arms or branches a to the burner, having small inside pipes for the return of the heated gas: A flame from each side of the burner above the base of the arms impinges upon and surrounds them, heating them to a high degree of temperature. The gas thus becomes highly heated and rarefied, making a large and brilliant flame. This description of burner is not suited to a gas below sixteen-candle power, gas below that standard requiring to be kept cool and condensed, while an eighteen or twenty candle or other rich gas gives a better light, and diffuses it better by being heated and expanded immediately prior to being consumed.

Referring to the annexed drawings, Plate 1 represents a vertical view of the boiler, superheater, hydrogen-retorts, double still, and the benches of liquid hydrocarbon gas and coal-gas retorts, with their supply and connecting pipes. Plate 2 is a continuation of Plate 1, and represents a side view of the three sets of the condensing, purifying, and measuring apparatus, and the two holders, with their connecting and discharge pipes. Plate 3, Fig. 1, represents a side view, partly in section, of the combination of apparatus for the manufacture of hydrogen and other gases by means of the upright retorts A 7, heated from within and filled with iron. Fig. 2 represents a sectional view of the two floats and cup attachments to the bridge-pipe, movable dip-pipe, and lever. Plate 4, Figs. 1, 2, 3, 4, 5, and 6, are sections of retorts as substitutes for retort A in specification. Fig. 7 is a plan of the double upright retort A. Fig. 8 is a view of the double burner. Fig. 9 is a sectional view of a burner for heating the gas before combustion.

In Plate 1, A indicates the double vertical retorts. B indicates the boiler. S indicates the superheater. $h$ indicates the pyrometer. $a$ indicates the pipe connecting boiler and superheater. $a^1$ indicates the pipe connecting boiler and pipes $p$ and $m$. $p$ indicates the pipe connecting superheater and retort A. $q$ indicates the pipe connecting the retort A and double still E F at I. P indicates the vapor-escape pipe connecting the double still E F, with the liquid hydrocarbon-gas retorts N. $r$ indicates the pipe connecting the retort A and the pipe P. $b$ indicates the branch pipes connecting the pipe P with the retorts N. $P^2$ $r'$ $b'$ indicate the pipes connecting the pipe $r$ and coal-gas retorts C. $m$ indicates the pipe connecting pipe $p$ and double still at $l$. $n$ indicates the pipe connecting pipes $m$ and $q$. L indicates the test-burner. E indicates the vaporizing-chamber of the double still. F indicates the combining and rarefying chamber of still. N indicates the liquid hydrocarbon-gas retorts. C indicates the coal-gas retorts. R indicates the stand-pipes from retorts N. $R^1$ indicates the stand-pipes from retorts C. $R^2$ indicates the stand-pipes from retorts A. M indicates the hydraulic main to retorts N. O indicates the hydraulic main to retorts N and C. M' indicates the hydraulic main to retorts A. $p'$ indicates the two floats and cup attachments to the bridge-pipe and movable dip-pipe and lever. T and T' indicate the tanks for hydrocarbon liquids. J indicates the siphon-pipe from tank T' to retorts A. $j$ indicates the siphon-pipe from tank T to chamber E of double still. *i* indicates the pipe connecting with pipes *m* and *n*, to convey superheated steam and hydrogen to vapor-escape pipe P. *z* indicates the pipe connecting pipe *r* with retort A, to convey the vapors from the double still to the retort A. *x* indicates the pipe connecting the pipes *m* and pipe *j*. *x'* indicates the pipe connecting the pipe *q* and pipe *m*. *t* indicates the steam-gage. *u* indicates the pressure-gages. *v* indicates the thermometers. *w* indicates the siphon from still. *c* indicates the pipe leading from the hydraulic main M to condensers Q', &c., and to holder H. *d* indicates the pipe leading from the hydraulic main O to condensers D, &c., and to holder H. *y* indicates the pipe leading from hydraulic main M' to condenser Q, &c., and to holder K. *e* indicates the branch pipes connecting pipe *y* from holder K, on Plate 2, with retorts C. *g* indicates the pipe connecting Y with retorts N. Y' indicates the pipe connecting Y with boiler, &c.

In Plate 2, *y'* indicates the pipe connecting the pipes *y* and *c*. *c'* indicates the pipe connecting the pipes *c* and *d*. D indicates the condenser for coal and combined gases. G indicates the exhauster for coal and combined gases. Z indicates the purifiers for coal and combined gases. *s* indicates the station-meter for coal and combined gases. Q' indicates the condenser for the liquid-hydrocarbon gases. $U^1$ indicates the exhauster for the liquid-hydrocarbon gases. $U^3$ indicates the purifiers for the liquid-hydrocarbon gases. $V^1$ indicates the station-meter for the liquid-hydrocarbon gases. Q indicates the condensers for hydrogen gas. U indicates the exhauster for hydrogen gas. $U^2$ indicates the purifiers for hydrogen gas. V indicates the station-meter for hydrogen gas. *o* indicates the pipe connecting the pipe *c* and *d* with the holder H. H indicates the holder for coal and combined gases. W indicates the outlet-pipe from holder H. K indicates the holder for hydrogen gas. X indicates the outlet-pipe from holder K. Y indicates the pipe from holder K to retort, benches, boiler, &c.

In Plate 3, Fig. 1, B indicates the boiler. S indicates the superheater. *a* indicates the pipe connecting boiler and superheater. E F indicate the duplex closed vessel or double still. *p* indicates the pipe connecting superheater and chamber E. *j* indicates the siphon-pipe from tank T to chamber E. T indicates the tank for liquid hydrocarbons. *a'* indicates the pipe connecting boiler and pipe *p*. *x* indicates the pipe connecting the pipe *a'* and pipe *j*. *l* indicates the pipe connecting the pipe *a'* and chamber E. P indicates the vapor-escape from chamber F of double still E F to furnace or retort $A^7$. *z* indicates the pipe leading from the vapor-escape pipe P to boiler B. P' indicates the pipe connecting the retort $A^7$ with the second retort $A^7$. $A^7$ and $A^7$ indicate the vertical retorts filled with iron, and heated from within. V and V' indicate the furnace-bars. Q and $Q^1$ indicate the ash-pits. D indicates the damper. W indicates the smoke-stack. U indicates the pipe leading from $A^7$ to condensers, &c., and holder. *t* indicates the steam-gage. *u* indicates the pressure-gages. *v* indicates the thermometers. *w* indicates the siphon-pipe from chamber F. *h* $h^1$ $h^2$ indicate the pyrometers.

In Fig. 2, A indicates the bridge-pipe. B indicates the vertical part attached to stand-pipe. C indicates the horizontal part. D indicates the vertical part attached to hydraulic main. F indicates the cup inside of D. H indicates the float in cup F. M indicates the moveable dip-pipe. T indicates the tar in the hydraulic main. W indicates the hydraulic main. G indicates the cup in upper half E of vertical pipe. I indicates the float in G. P indicates the lever.

In Plate 4, Fig. 7, A indicates the double vertical retort. $B^1$ $B^2$ indicate the two vertical sections of retort.

What I claim, and desire to secure by Letters Patent, is—

1. The process of manufacturing hydrogen gas continuously from superheated steam by the use of hydrocarbon to deoxidize iron when in process of oxidation by contact with superheated steam, substantially in the manner herein described, and for the purpose set forth.

2. The process of manufacturing illuminating gas by combining hydrogen gas, and superheated steam, and the vapors of hydrocarbons, and then converting them in red-hot retorts into a fixed illuminating-gas, substantially in the manner herein described, and for the purpose set forth.

3. The combination of hydrogen gas, produced in the manner herein described, and gas made from coal, and gas from hydrocarbon liquids, substantially in the manner herein described, and for the purpose set forth.

4. The combination of illuminating-gas, produced from commingled hydrogen gas, superheated steam, and hydrocarbon vapors, as herein described, and coal-gas in the hydraulic main, substantially in the manner herein described, and for the purpose set forth.

5. In the apparatus for the manufacture of illuminating-gas, a duplex closed vessel or double still, wherein liquid hydrocarbon is vaporized, and the vapors commingled with hydrogen gas and superheated steam, no liquid of any kind being filled into or allowed to accumulate in said still, substantially in the manner herein described, and for the purpose set forth.

6. In an apparatus for the manufacture of gas, a movable dip-pipe with two floats and cup attachments to the bridge-pipe and movable lever, substantially in the manner herein described, and for the purpose set forth.

7. In an apparatus for the manufacture of hydrogen gas, the combination of the boiler B, pipes *a* and *a'*, superheater S, pyrometer *h*, pipe *p*, tank $T^1$, siphon-pipe J, retorts A $A^1$ $A^2$ $A^3$ $A^4$ $A^5$ $A^6$ $A^7$, stand-pipes $R^2$, floats and cup attachments, and movable dip-pipe and lever P¹, hydraulic main M¹, pipes $y\ y'\ X\ Y\ Y'$, condensers Q, exhauster U, purifiers U², station-meter V, holder K, substantially in the manner herein described, and for the purpose set forth.

8. In an apparatus for the manufacture of hydrogen gas, the combination of boiler B, pipes $a$ and $a'$, superheater S, pyrometer $h$, pipe $p\ i\ n\ q\ m$, branch pipes $x\ x'$, closed duplex vessel or double still E F, tank T, siphon-pipes $j$, steam-gage $t$, pressure-gages $u$, thermometers $v$, siphon-pipe $w$, pipes P $r\ z$, retorts A A¹ A² A³ A⁴ A⁵ A⁶ A⁷, stand-pipes R², floats and cup attachments, and movable dip-pipe and lever P¹, hydraulic main M', pipes $y\ y'$ X Y Y', condensers Q, exhauster U, purifiers U², station-meter V, holder K, substantially in the manner herein described, and for the purpose set forth.

9. The process of making a vapor of commingled superheated steam and hydrocarbon by introducing the hydrocarbon liquid in small quantities simultaneously with superheated steam into an otherwise empty duplex still, or vaporizing, commingling, and expanding chambers, for illuminating and heating purposes, substantially in the manner herein described, and for the purpose set forth.

10. In an apparatus for the manufacture of hydrogen gas, a vertical vessel or retort lined with fire-bricks, and filled with iron chains or pieces of iron of suitable size, into which a current of commingled superheated steam and hydrocarbon vapors is made to flow, the iron in said upright retort being heated by the combustion of the said superheated steam and hydrocarbon vapors, and then the said superheated steam being decomposed into hydrogen gas by the combined action of the heated iron and hydrocarbon, substantially in the manner herein described, and for the purpose set forth.

11. In an apparatus for the manufacture of illuminating-gas from a combination of hydrogen gas, superheated steam, and hydrocarbon vapors, the combination of boiler B, pipes $a$ and $a'$, superheater S, pyrometer $h$, pipe $p$, tank T', siphon-pipe J, retorts A A¹ A² A³ A⁴ A⁵ A⁶ A⁷, pipe $q$, pipes $i\ m\ n\ r$, tank T, siphon-pipe $j$, branch pipes $x\ x'$, double still E F, steam-gage $t$, pressure-gage $u$, thermometers $v$, siphon-pipe $w$, pipe P, pipe $c$, branch pipes $b$, retorts in bench No. 1, N, stand-pipes R, floats and cup attachments and movable dip-pipe and lever P¹, hydraulic main M, pipes $c\ c'$ and W Y Y', condensers Q', exhauster U¹, purifiers U³, station-meter V', holder H, substantially in the manner herein described, and for the purpose set forth.

12. In an apparatus for the manufacture of illuminating-gas from a combination of gas made from a combination of hydrogen gas, superheated steam, and hydrocarbon vapors with coal-gas in the hydraulic main, the combination of boiler B, pipes $a$ and $a'$, superheater S, pyrometer $h$, pipe $p$, tank T', siphon-pipe J, retorts A A¹ A² A³ A⁴ A⁵ A⁶ A⁷, pipe $q$, pipes $m\ n\ i\ r$, tank T, siphon-pipe $j$, branch pipes $x\ x'$, duplex still E F, steam-gage $t$, pressure-gages $u$, thermometer $v$, siphon-pipe $w$, pipe P $z$, pipes P² and $r'$, branch pipe $b\ b'$, and retorts N and C in bench No. 2, pipes Y $e\ g$ Y' W, stand-pipes R R¹, hydraulic main O, floats and cup attachments and movable dip-pipe and lever P¹, pipe $d$, condensers D, exhauster G, purifiers Z, station-meter $s$, pipe $o$, holder H, constructed substantially in the manner herein described, and for the purpose set forth.

13. In an apparatus for the manufacture of hydrogen and combined gases, the combination of boiler B, pipes $a$ and $a'$, superheater S, pipe $p$, pyrometer $h$, pipe $l$, pipe $x$, tank T, siphon-pipe $j$, duplex still E F, pipes P $z$, steam-gage $t$, pressure-gages $u$, thermometers $v$, siphon-pipe $w$, upright retorts A⁷, filled with iron and heated from within, pipe P¹, pyrometers $h^1\ h^2$, damper D, smoke-stack W, discharge-pipe U to condensers, exhauster, purifiers, station-meter, and holder, constructed substantially in the manner herein described, and for the purpose set forth.

In testimony that I claim the foregoing as my own I affix my signature in presence of two witnesses.

JOSEPH PEARSON GILL.

Witnesses:
WM. H. GRENELLE,
JOSEPH W. BEATLEY.